United States Patent
Stout et al.

(10) Patent No.: US 10,033,461 B2
(45) Date of Patent: Jul. 24, 2018

(54) LIGHT-BASED COMMUNICATION (LCOM) VISUAL HOTSPOTS

(71) Applicant: OSRAM SYLVANIA Inc., Wilmington, MA (US)

(72) Inventors: Barry Stout, Beverly, MA (US); Christian Breuer, Dortmund (DE); Anant Aggarwal, Waltham, MA (US); Bernhard Siessegger, Unterschleissheim (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/128,052

(22) PCT Filed: Mar. 25, 2015

(86) PCT No.: PCT/US2015/022529
§ 371 (c)(1),
(2) Date: Sep. 21, 2016

(87) PCT Pub. No.: WO2015/148694
PCT Pub. Date: Oct. 1, 2015

(65) Prior Publication Data
US 2017/0104532 A1   Apr. 13, 2017

Related U.S. Application Data

(60) Provisional application No. 61/970,310, filed on Mar. 25, 2014, provisional application No. 61/970,321, (Continued)

(51) Int. Cl.
*H04B 10/116* (2013.01)
*H04B 10/114* (2013.01)
(Continued)

(52) U.S. Cl.
CPC ....... *H04B 10/116* (2013.01); *H04B 10/1149* (2013.01); *H04L 67/02* (2013.01)

(58) Field of Classification Search
CPC .... H04B 10/116; H04B 10/1149; H04L 67/02
(Continued)

(56) References Cited

U.S. PATENT DOCUMENTS 8,646,060 B1 * 2/2014 Ben Ayed ........... H04L 63/0853
726/9
9,465,484 B1 * 10/2016 Kamarshi ............... G06F 3/042
(Continued)

FOREIGN PATENT DOCUMENTS

| CN | 102 288 940 A | 12/2011 |
| CN | 103 033 834 A | 4/2013 |

(Continued)

OTHER PUBLICATIONS

Satou [WO 2008/010274, Google Translation].*
(Continued)

*Primary Examiner* — Oommen Jacob
(74) *Attorney, Agent, or Firm* — Yutian Ling

(57) ABSTRACT

Techniques are disclosed for projecting visible cues to assist with light-based communication (LCom), the visible cues referred to herein as visual hotspots. The visual hotspots can be projected, for example, using a luminaire that may be LCom-enabled. The visual hotspots may be projected onto the floor of an area including an LCom system. The visual hotspots can be used for numerous benefits, including alerting a potential user that LCom is available, educating the user about LCom technology, and assisting the user in using the LCom signals available in the area. The visual hotspots may include images, symbols, cues, characters (e.g., letters, words, numbers, etc.), indicators, logos, or any other suitable content. In some cases, the visual hotspots may be
(Continued)

interactive, such that a user can scan the hotspot to cause an action to occur (e.g., launch an application or website).

19 Claims, 7 Drawing Sheets

Related U.S. Application Data filed on Mar. 25, 2014, provisional application No. 61/970,323, filed on Mar. 25, 2014.

(51) Int. Cl.
*H04W 4/02* (2018.01)
*H04W 4/00* (2018.01)
*H04L 29/08* (2006.01)

(58) Field of Classification Search
USPC .......................................... 398/118, 115, 116
See application file for complete search history.

(56) References Cited

U.S. PATENT DOCUMENTS

| | | |
|---|---|---|
| 2002/0089722 A1 | 7/2002 | Perkins et al. |
| 2006/0056855 A1 | 3/2006 | Nakagawa et al. |
| 2006/0239689 A1 | 10/2006 | Ashdown |
| 2008/0281515 A1 | 11/2008 | Ann et al. |
| 2008/0310850 A1 | 12/2008 | Pederson et al. |
| 2009/0026978 A1 | 1/2009 | Robinson |
| 2009/0171571 A1 | 7/2009 | Son et al. |
| 2009/0180780 A1 | 7/2009 | Ann et al. |
| 2009/0196622 A1 | 8/2009 | Shin et al. |
| 2010/0188004 A1 | 7/2010 | Baggen et al. |
| 2011/0010090 A1* | 1/2011 | Bae ................ G01C 21/00 701/532 |
| 2011/0204805 A1 | 8/2011 | Li et al. |
| 2011/0217044 A1 | 9/2011 | Kang et al. |
| 2012/0002974 A1 | 1/2012 | Schenk et al. |
| 2012/0128366 A1* | 5/2012 | Lee .................. H04B 10/1121 398/118 |
| 2013/0141554 A1 | 6/2013 | Ganick et al. |
| 2013/0211715 A1 | 8/2013 | Bae et al. |
| 2013/0212289 A1* | 8/2013 | Krishnakumar .... H04L 12/1822 709/228 |
| 2013/0228624 A1 | 9/2013 | Byrd et al. |
| 2013/0266327 A1 | 10/2013 | Bae et al. |
| 2013/0278172 A1 | 10/2013 | Maxik et al. |
| 2013/0336525 A1* | 12/2013 | Kurtz ...................... B41M 3/10 382/103 |
| 2014/0342660 A1* | 11/2014 | Fullam ................... H04N 7/181 455/3.06 |
| 2016/0112839 A1* | 4/2016 | Choi ..................... H04W 4/023 455/41.2 |
| 2017/0104532 A1* | 4/2017 | Stout .................... H04B 10/116 |

FOREIGN PATENT DOCUMENTS

| | | |
|---|---|---|
| JP | 2009 005191 A | 1/2009 |
| WO | 2008/010274 A1 | 1/2008 |
| WO | 2008/148039 A1 | 12/2008 |
| WO | 2013/005122 A1 | 1/2013 |

OTHER PUBLICATIONS

Nicholas Petitit, International Search Report and Written Opinion of the International Searching Authority for PCT/US2015/021219, dated Jun. 9, 2015, pp. 1-11, European Patent Office, Rijswijk, The Netherlands.

Nicholas Petitit, International Search Report and Written Opinion of the International Searching Authority for PCT/US2015/022321, dated Jun. 23, 2015, pp. 1-10, European Patent Office, Rijswijk, The Netherlands.

Nicholas Petitit, International Search Report and Written Opinion of the International Searching Authority for PCT/US2015/021177, dated May 29, 2015, pp. 1-11, European Patent Office, Rijswijk, The Netherlands.

Nicholas Petitit, International Search Report and Written Opinion of the International Searching Authority for PCT/US2015/021160, dated Jul. 29, 2015, pp. 1-11, European Patent Office, Rijswijk, The Netherlands.

Nicholas Petitit, International Search Report and Written Opinion of the International Searching Authority for PCT/US2015/022529, dated Jun. 2, 2015, pp. 1-13, European Patent Office, Rijswijk, The Netherlands.

Nicolas Vanhaecke, International Search Report and Written Opinion of the International Searching Authority for PCT/US2015/022534, dated Oct. 14, 2015, pp. 1-17, European Patent Office, Rijswijk, The Netherlands.

Petitit, Nicolas, Communication Pursuant to Article 94(3) EPC for counterpart application 15717321.2, dated Feb. 23, 2018, European Patent Office, Munich, DE, 76 pages.

* cited by examiner

US 10,033,461 B2

LIGHT-BASED COMMUNICATION (LCOM) VISUAL HOTSPOTS

CROSS-REFERENCE TO RELATED APPLICATIONS

This patent application is a National Stage application of, and claims the benefit of, International Application No. PCT/US2015/022529, filed Mar. 25, 2015, which claims the benefit of: U.S. Provisional Patent Application No. 61/970,310, titled "Light Communication Receiver", filed on Mar. 25, 2014; U.S. Provisional Patent Application No. 61/970,321 titled "Light Communication Luminaire Positioning", filed on Mar. 25, 2014; and U.S. Provisional Patent Application No. 61/970,323, titled "Light Communication to Occupant", filed on Mar. 25, 2014. Each of these patent applications is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

Figure 1:
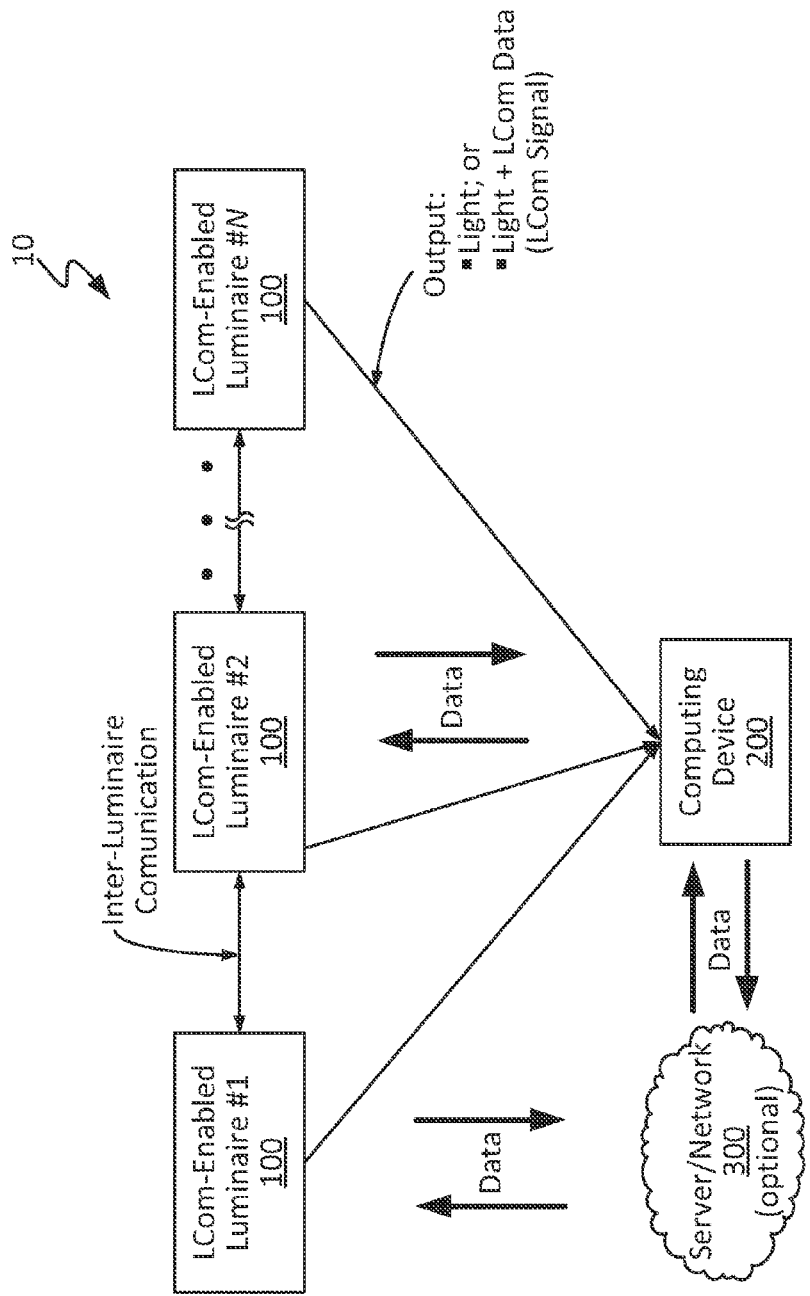
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for projecting visible cues to assist with light-based communication (LCom), the visible cues referred to herein as visual hotspots. The visual hotspots can be projected, for example, using a luminaire that may or may not be LCom-enabled. The visual hotspots may be projected onto the floor or ground of an area including an LCom system, or on another suitable surface. The visual hotspots can be used for numerous benefits, including alerting a potential user that LCom is available, educating the user about LCom technology, and assisting the user in using the LCom signals available in the area, just to name a few example benefits. The visual hotspots may include images, symbols, cues, characters (e.g., letters, words, numbers, etc.), indicators, logos, or any other suitable content. In some cases, the visual hotspots may be interactive, such that a user can scan the hotspot (e.g., using a smartphone camera) to cause an action to occur (e.g., launch an application or website). In some embodiments, the hotspots may alternatively or additionally include audio cues. Numerous configurations and variations will be apparent in light of the present disclosure.

General Overview

Existing smartphones and mobile computing devices utilize a combination of global positioning system (GPS) and Wi-Fi technologies to provide navigation capabilities, such as various Wi-Fi positioning systems (WPS). However, these existing GPS-based and Wi-Fi-based techniques suffer from a number of limitations that make their use impractical for indoor navigation. In particular, GPS has an accuracy of only several meters, and the availability and range of Wi-Fi network connections are limited by factors such as the placement of Wi-Fi hotspots, security restrictions imposed by network providers, and other environmental factors. Thus, the combination of GPS and Wi-Fi can fail to achieve sufficiently refined accuracies for purposes of indoor navigation. This is particularly evident in the example context of attempting to navigate a user to an item of interest on a shelf in a retail store. These complications can be compounded by the fact that retail stores are typically hesitant to grant customers access to in-store wireless networks because of potential security risks.

Thus, and in accordance with some embodiments of the present disclosure, techniques are disclosed that can be implemented, for example, as a system for navigation and positioning using light-based communication. As used herein, light-based communication (LCom) generally refers to communication between a solid-state luminaire and a receiver device, such as a smartphone or other mobile computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, in an LCom system, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera and/or an ambient light sensor, among others. As used herein, "light sensor" includes any device capable of detecting light or other electromagnetic energy, such as a photodetector, optical detector, image capture device, camera, light-emitting diodes (LEDs) configured to act as a photodiode, charge-coupled device (CCD), active-pixel sensor (APS), or any other suitable light sensing device as will be apparent in light of the present disclosure. In some embodiments, the total light output may be maintained at a relatively constant level, such that the light output variance is not perceptible by human vision.

As will be appreciated in light of this disclosure, there are many non-trivial challenges to establishing and maintaining successful LCom between an LCom-enabled luminaire and a given receiver device, as well as to using LCom to determine location and positioning of the receiver device (and thus the user, if present) for purposes of providing navigation, indoor or otherwise, or for other suitable applications. For example, one such challenge is ensuring the luminaire knows its own absolute and/or relative location (or position). The luminaire may be programmed with location information using techniques referred to herein as commissioning. However, in some cases, particularly when a luminaire is indoors, location information for the luminaire may not be readily available or easily determined. In addition, issues arise after a luminaire has been commissioned for a particular location and subsequently moved, because the luminaire would then be emitting improper location information, requiring that it be re-commissioned. Manually keeping track of commissioned versus noncommissioned or improperly commissioned luminaires would be time consuming and tedious. Another such challenge is providing notice that LCom is available in a particular location. Such a challenge may be present due to LCom being designed, in some embodiments, to be difficult or impossible to detect by the human eye to prevent the issues that would come with visibly pulsing/modulating light output. Further, such a challenge may be present due to an LCom-enabled luminaire being overhead, such that it is not in potential users' typical visual line of sight. As a result, even if a visual cue were provided near or on an LCom-enabled luminaire, users may not look at the luminaire in their normal course of using the space containing the luminaire. Further still, such a challenge may be present due to LCom technology being new and unknown to potential users. Therefore, educating potential users that LCom is available and also teaching users how to effectively use LCom is a challenge.

Thus and in accordance with some embodiments, techniques are disclosed for programming a luminaire with location information, referred to herein as commissioning. Location information may include relative location information (e.g., the position of the luminaire relative to a reference point) and/or absolute location information (e.g., global coordinates for the luminaire). A commissioned luminaire can then be configured to emit its location information via the light-based communication (LCom) techniques variously described herein. In some cases, the luminaire can be commissioned manually, by hard coding the luminaire with its location either at the luminaire itself or using a computing device (e.g., a smartphone, tablet, or a dedicated luminaire commissioning device) to program the luminaire with location information. In some such cases, the luminaire location information may be re-flashed into the non-volatile memory of the luminaire, for example. In some cases, the luminaire can be commissioned automatically. For example, in some such cases, a luminaire may be configured to self-heal after being moved by estimating its location information over time in an iterative process, as will be described in more detail herein. In some cases, the luminaire may be configured to determine when it has been physically moved to begin automatic commissioning and/or to provide notice to a user that the luminaire requires re-commissioning. In some such cases, the luminaire may provide feedback or notice (e.g., in a visual, aural, and/or tactile manner) that the luminaire needs to be commissioned. For example, when initially installing a system including multiple luminaires, each luminaire may be configured to blink visible light until it has been commissioned, thereby allowing a user to distinguish between commissioned and noncommissioned luminaires. In another example, when an already commissioned luminaire has been moved, the luminaire may blink visible light to indicate that the luminaire needs to be re-commissioned.

Some embodiments relate to techniques for projecting visible cues to assist with the LCom system, the visible cues referred to herein as visual hotspots. The visual hotspots can be projected, for example, using a luminaire that may or may not be LCom-enabled. The visual hotspots may be projected onto the floor or ground of an area including an LCom system, or on another suitable surface. The visual hotspots can be used for numerous benefits, including alerting a potential user that LCom is available, educating the user about LCom technology, and assisting the user in using the LCom signals available in the area, just to name a few example benefits. The visual hotspots may include images, symbols, cues, characters (e.g., letters, words, numbers, etc.), indicators, logos, or any other suitable content. In some cases, the visual hotspots may be interactive, such that a user can scan the hotspot (e.g., using a smartphone camera) to cause an action to occur (e.g., launch an application or website). In some embodiments, the hotspots may alternatively or additionally include audio cues.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom-enabled luminaire and a receiver device. This information may be utilized, in part or in whole, to provide for indoor navigation, in accordance with some embodiments. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for commercial endeavors not possible with existing GPS-based and Wi-Fi-based approaches. More particularly, while the limited accuracy of existing GPS-based and Wi-Fi-based approaches is not sufficient for, for example, directing a customer to an item of interest on a shelf within a retail store, techniques disclosed herein can be utilized, in accordance with some embodiments, to lead customers directly to in-store promotions and other on-shelf items, as desired. Numerous configurations and variations will be apparent in light of this disclosure.

System Architecture and Operation

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in both or multiple directions; for instance, LCom data may be passed between a given LCom-enabled luminaire 100 and a computing device 200, where both act in a transmitting and receiving (e.g., transceiver) capacity. In some cases in which system 10 includes a plurality of LCom-enabled luminaires 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCom-enabled luminaires 100, as desired. In some embodiments, computing device 200 and one or more luminaires 100 may be communicatively coupled to allow for the transmission of data between the device 200 and luminaire(s) 100.

Figure 2A:
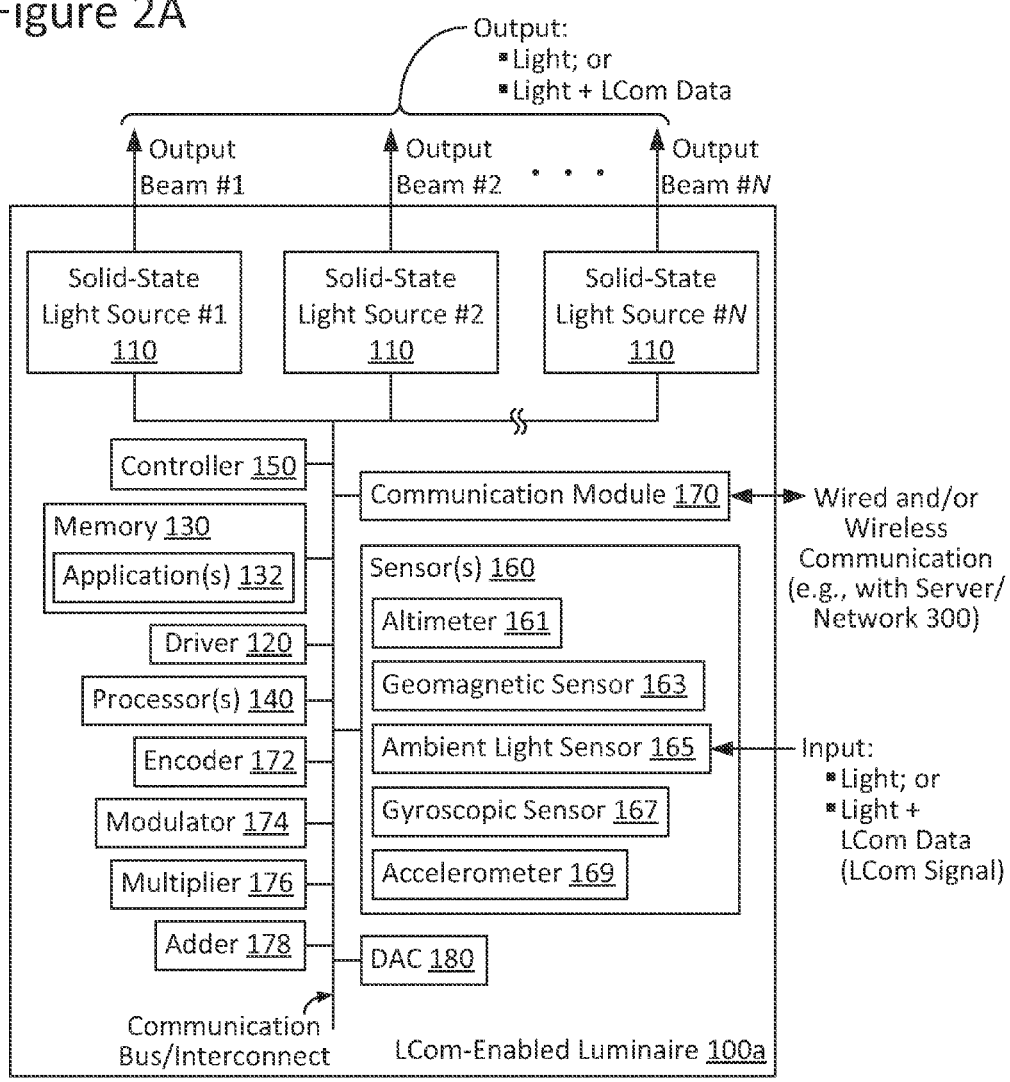
FIG. 2A is a block diagram illustrating an LCom-enabled luminaire configured in accordance with an embodiment of the present disclosure.
Figure 2B:
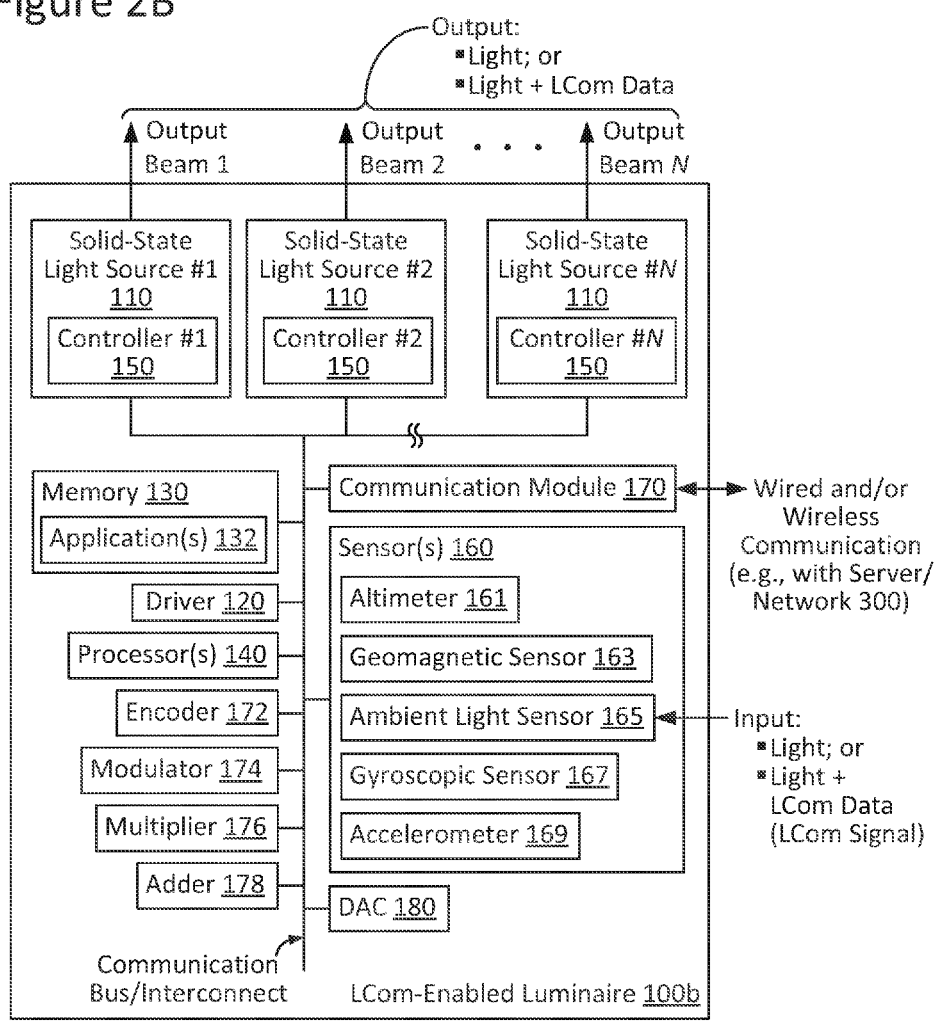
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. For consistency and ease of understanding of the present disclosure, LCom-enabled luminaires 100a and 100b hereinafter may be collectively referred to generally as an LCom-enabled luminaire 100, except where separately referenced.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis.

The one or more modules stored in memory 130 can be accessed and executed, for example, by the one or more processors 140 of a given LCom-enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCom-enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCom-enabled luminaire 100 may be configured to receive input, for example, via one or more applications 132 stored in memory 130 (e.g., such as a lighting pattern, LCom data, etc.). Other suitable modules, applications, and data which may be stored in memory 130 (or may be otherwise accessible to a given LCom-enabled luminaire 100) will depend on a given application and will be apparent in light of this disclosure.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150, in accordance with some embodiments. In some embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1–N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCom-enabled luminaire 100 may be controlled in such a manner as to output any number of output beams (1–N), which may include light and/or LCom data (e.g., an LCom signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional server/network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Other suitable configurations for DAC 180 will depend on a given application and will be apparent in light of this disclosure.

Figure 3:
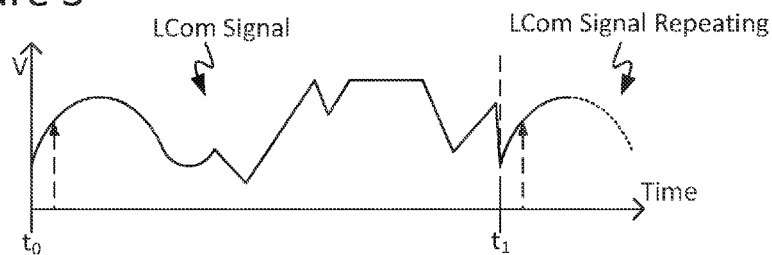
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured, in accordance with some embodiments, to transmit a given LCom signal at a given transmission rate over a given time interval ($t_1$-$t_0$). In some cases, a given LCom-enabled luminaire 100 may be configured to repeatedly output its one or more LCom signals. In any case, the transmission rate may be customized, as desired for a given target application or end-use.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 4:
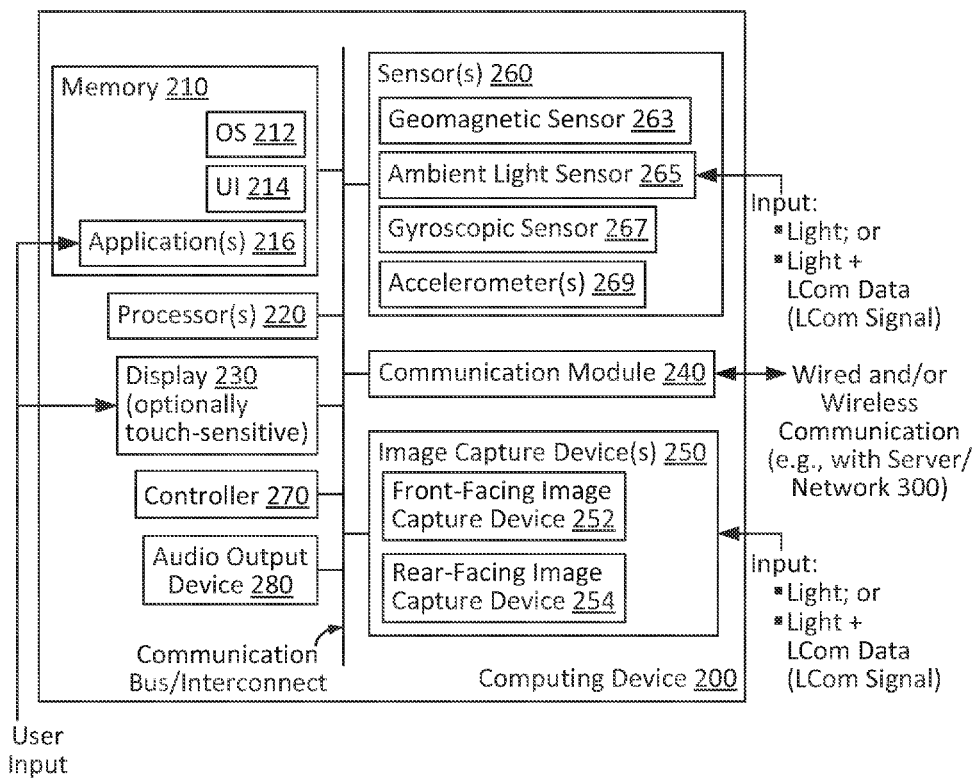
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure. In some embodiments, computing device 200 may be a dedicated luminaire commissioning device, as will be described in more detail herein.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCom-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touch-screen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100. In some cases, communication module 240 of computing device 200 and communication module 170 of a given LCom-enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCom-enabled luminaires 100. In some cases, computing device 200 may be configured to receive data from server/network 300, for example, which serves to supplement LCom data received by computing device 200 from a given LCom-enabled luminaire 100. In some instances, computing device 200 may be configured to receive data (e.g., such as position, ID, and/or other data pertaining to a given LCom-enabled luminaire 100) from server/network 300 that facilitates indoor navigation via one or more LCom-enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

Commissioning a Luminaire with Location Information

As previously noted, there are a number of non-trivial challenges to establishing and maintaining successful LCom between an LCom-enabled luminaire and a given receiver device, as well as to using LCom to determine location and positioning of the receiver device (and thus the user, if present) for purposes of providing navigation, indoor or otherwise, or for other suitable applications. For example, one such challenge is ensuring the luminaire knows its own absolute and/or relative location (or position). The luminaire may be programmed with location information using techniques referred to herein as commissioning. However, in some cases, particularly when a luminaire is indoors, location information for the luminaire may not be readily available or easily determined. In addition, issues arise after a luminaire has been commissioned for a particular location and subsequently moved, because the luminaire would then be emitting improper location information, requiring that it be re-commissioned. Manually keeping track of commissioned versus noncommissioned or improperly commissioned luminaires can be time consuming and tedious.

Thus and in accordance with some embodiments, techniques are disclosed for programming a luminaire with location information, referred to herein as commissioning. Location information may include relative location information (e.g., the position of the luminaire relative to a reference point) and/or absolute location information (e.g., global coordinates for the luminaire). A commissioned luminaire can then be configured to emit its location information via the light-based communication (LCom) techniques variously described herein. In some cases, the luminaire can be commissioned manually, by hard coding the luminaire with its location either at the luminaire itself or using a computing device (e.g., a smartphone, tablet, or a dedicated luminaire commissioning device) to program the luminaire with location information. In some such cases, the luminaire location information may be re-flashed into the non-volatile memory of the luminaire, for example. In some cases, the luminaire can be commissioned automatically. For example, in some such cases, a luminaire may be configured to self-heal after being moved by estimating its location information over time in an iterative process, as will be described in more detail herein. In some cases, the luminaire may be configured to determine when it has been physically moved to begin automatic commissioning and/or to provide notice to a user that the luminaire requires re-commissioning. In some such cases, the luminaire may provide feedback or notice (e.g., in a visual, aural, and/or tactile manner) that the luminaire needs to be commissioned. For example, when initially installing a system including multiple luminaires, each luminaire may be configured to blink visible light until it has been commissioned, thereby allowing a user to distinguish between commissioned and noncommissioned luminaires. In another example, when an already commissioned luminaire has been moved, the luminaire may blink visible light to indicate that the luminaire needs to be re-commissioned. In some cases, the luminaire may include one or more sensors (e.g., accelerometer(s), gyroscopic sensor(s), geomagnetic sensor(s), etc.) that are on-board, integral, or otherwise operatively coupled such that the luminaire can detect that it has been moved and/or determine the new position it has been relocated to without the assistance of external/non-operatively coupled devices.

Figure 5A:
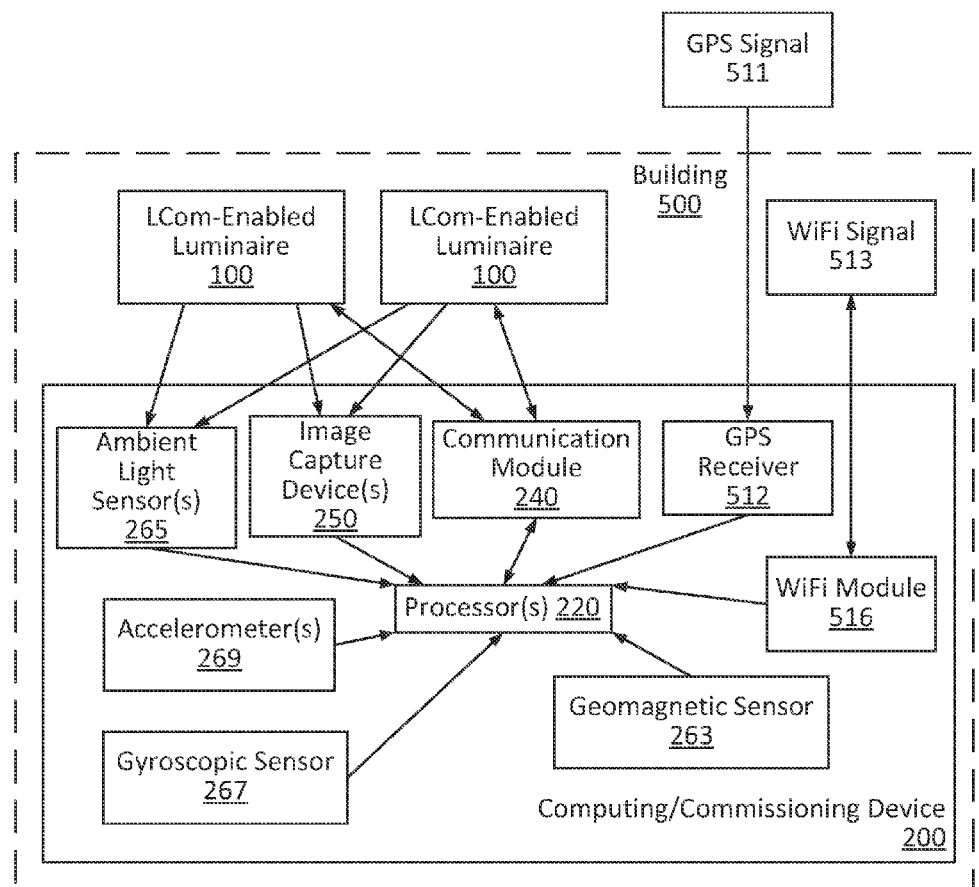
FIG. 5A illustrates an example LCom system, including LCom-enabled luminaires and a computing/commissioning device, in accordance with an embodiment of the present disclosure.

FIG. 5A illustrates an example LCom system, including LCom-enabled luminaires 100 and computing/commissioning device 200, in accordance with an embodiment of the present disclosure. In this example system, device 200 includes ambient light sensor 265, image capture device(s) 250, accelerometer(s) 269, gyroscopic sensor 267, geomagnetic sensor 263, communication module 240, GPS receiver, 512, and Wi-Fi module 522 all configured to provide input to processor(s) 220. Note that GPS receiver 512 and/or Wi-Fi 522 module may be included with communication module 240. Although device 200 need not have all of the componentry shown in FIG. 5A, and device 200 may have additional or alternative componentry as variously described herein, the specific configuration shown will be used herein for ease of description. As can also be seen in this example embodiment, ambient light sensor(s) 265 and image capture device(s) 250 are configured to receive LCom signals from one or more LCom-enabled luminaires 100, GPS receiver 512 is configured to receive GPS signals 510 (e.g., from a satellite), and Wi-Fi module 522 is configured to receive/transmit Wi-Fi signals 520 (e.g., from a Wi-Fi router). Accordingly, device 200 may be configured to determine location information using a light based positioning system (e.g., using LCom signals received from LCom-enabled luminaire 100), GPS, or WPS. In this example embodiment, device 200 and LCom-enabled luminaire are in building 500 represented by the dotted line box. However, the dotted line box may also represent a vehicle, such as a bus, plane, ship, or train, for example, or another suitable space. In addition, Wi-Fi signal 520 is being transmitted/received from within building 500, while GPS signal 510 is being transmitted from outside of building 500; however, that need not be the case. The example configuration and layout in FIG. 5A is provided for illustrative purposes and is not intended to limit the present disclosure.

In some embodiments, computing/commissioning device 200 may be configured to augment positioning techniques using an inertial navigation system (INS) to assist with the commissioning process. The INS may utilize accelerometer(s) 269 and/or gyroscopic sensor 267 to calculate, via dead reckoning, the position, orientation, and velocity of the device. In this manner, device 200 can calculate its relative position using the INS based on a known starting/reference point or location. For example, the following equation may be used for the device INS:

$$\vec{s}(t) = \vec{s_{t_0}} + \int_{t_0}^{t}\left(\int_{t_0}^{t}\vec{a}(t)\,dt\right)dt$$

where $\vec{s_{t_0}}$ is the last valid position of device 200 and $\vec{a}(t)$ the absolute acceleration data computed using accelerometer(s) 269 and/or gyroscopic sensor 267. In some embodiments, device 200 positioning may be augmented using the heading of device 200, which can be obtained from geomagnetic sensor 263, for example.

Figure 5B:
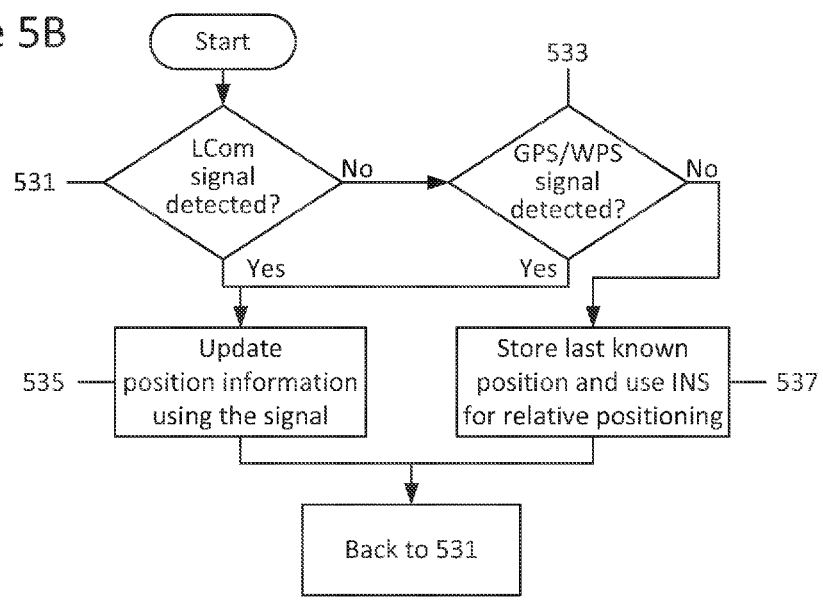
FIG. 5B illustrates an example method of augmenting computing/commissioning device positioning using an inertial navigation system (INS), in accordance with an embodiment of the present disclosure.

FIG. 5B illustrates an example method of augmenting computing/commissioning device positioning using an inertial navigation system (INS), in accordance with an embodiment of the present disclosure. For ease of description, the system of FIG. 5A will be used to describe the methodology. The method includes determining 531 if an LCom signal is detected. Determination 531 can be performed using any suitable technique, such as using ambient light sensor(s) 265 and/or image capture device(s) 250. If at 531, no LCom signal is detected, then the method continues by determining 533 if a GPS and/or WPS signal is detected. In some embodiments, determination 533 may also include determining if any other positioning system signal is detected, depending upon the configuration of device 200. If at 531, an LCom signal is detected, or at 533, a GPS/WPS signal is detected, then the method continues by updating 535 position information using the detected signal to determine the location of device 200. In some embodiments, the method primarily relies on determining device 200 positioning information using an LCom signal, such that whenever an LCom signal is available, it is used for device positioning. This may be the case because the LCom signal(s) may be used for the most accurate positioning technique compared to using, for example, GPS and/or WPS signals. In other embodiments, there may not be a preference. In some embodiments, the location of device 200 may dictate the positioning system used. For example, in some such embodiments, if device 200 senses it is outside, then GPS may be used as the default positioning system until device 200 senses it is inside. Further, in some embodiments, memory and/or power may be conserved by limiting or prioritizing positioning systems based on the environment of device 200, the last received positioning signal of device 200, or based on some other factor as will be apparent in light of this disclosure.

Continuing with the method of FIG. 5B, if no LCom signal is detected at 531 and no GPS/WPS signal is detected at 533, the method continues by storing 537 the last known position or location of device 200 and using the INS to determine position information for device 200 relative to that last known position/location. In some cases, the last known position may be the last position updated at 535. In any case, the last known position may be determined using the last known position of the device based on an LCom signal, a GPS signal, WPS signal, and/or any other suitable technique. In some embodiments, the device INS runs parallel to other positioning techniques to continuously calculate the relative position of device 200. In such cases, box 537 of the method may be continually performed to, for example, increase device positioning accuracy. In other embodiments, the device INS may be activated after losing the communication link to other positioning systems (e.g., when no LCom, GPS, or WPS signals are detected). The method continues from boxes 535 and 537 by returning back to box 531, to continue to determine whether an LCom signal (or GPS/WPS signal) is detected.

A benefit of augmenting position information of computing/commissioning device 200 using an INS is that, despite not being able to retrieve location information from another positioning system, the device 200 can still estimate its approximate location. The techniques may also be beneficial for estimating vertical positioning and/or height information, such as positioning within an elevator. For example, the INS may be used to estimate elevator floor position relative to the starting floor (the floor where the elevator was entered). Such an example may allow the device 200 to know when the desired floor position has been achieved and/or when to exit the elevator. Additional benefits will be apparent in light of the present disclosure.

As a result of commissioning/computing device 200 being able to determine its position using at least the techniques variously described herein, device 200 can then be used to commission luminaires. In some embodiments, a user can manually commission a luminaire 100 using a commissioning/computing device 200 to, for example, stand directly beneath the luminaire 100 and transmit location information to the luminaire 100 using communication modules 170 and 265 of luminaire 100 and device 200, respectively. For example, location information may be transmitted via any suitable wired or wireless communication protocol described herein (e.g., via IR, Wi-Fi, or Bluetooth) or any other suitable known communication technique. Transmission of the location information to commission the luminaire 100 may be made using any suitable technique, such as having a user manually select when the device 200 is underneath the luminaire 100 to indicate that the location information is to be programmed for the luminaire 100, for example. Such programming may include, for example, storing the location information in memory 130 (e.g., non-volatile memory). Further, in some instances, the particular luminaire 100 desired to be commissioned may be identified prior to the commissioning to ensure that the proper luminaire 100 is commissioned. This process can be repeated until all luminaires 100 are commissioned.

In some embodiments, commissioning may be performed automatically. This may be achieved by one or more luminaires 100 by collecting information from one or more commissioning/computing devices 200 over time to estimate location information. For example, a luminaire 100 may automatically commission itself over time in an iterative process whereby the location information from devices 200 can be used to approximate the position of the luminaire 100. In return, this improves the location information the luminaire provides to devices 200, resulting in the entire lighting system 10 having more accurate positioning information. In some embodiments, the location information provided by the commissioning device 200 may be transmitted directly to the luminaire 100 being commissioned, and that location information may be stored locally with the luminaire 100 (e.g., in memory 130). In some embodiments, the location information may be associated with the luminaire 100 being commissioned. For example, in the case where the luminaire emits identification (e.g., an LCom-enable luminaire ID), the location information may be associated with that ID during the commissioning process. The association of the luminaire location information and ID may occur external to the luminaire, such as storing such information in a server/network 300 (e.g., in cloud storage) or at a centralized lighting system hub that stores data for all luminaires within the system, for example.

Figure 5C:
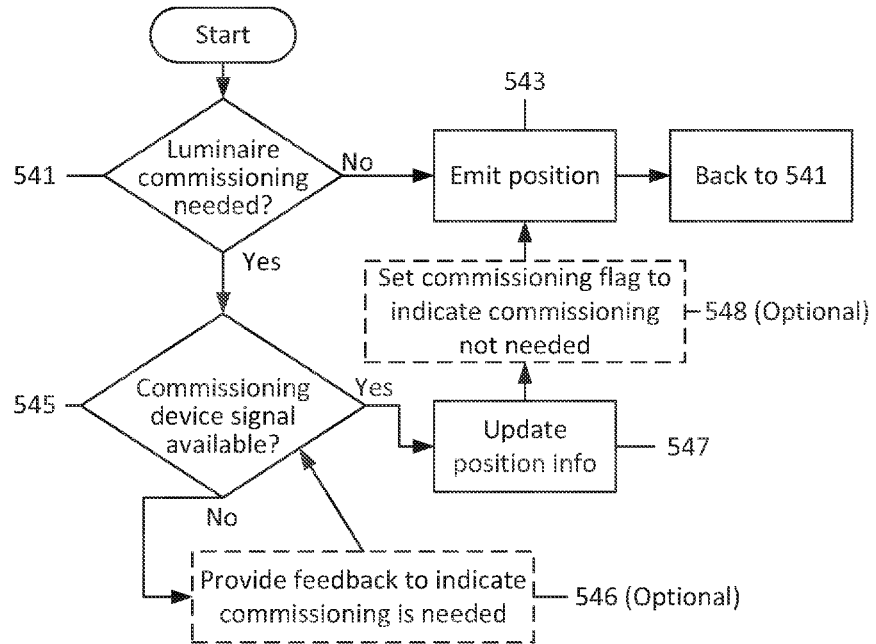
FIG. 5C illustrates an example method of commissioning a luminaire with location information, in accordance with an embodiment of the present disclosure.

FIG. 5C illustrates an example method of commissioning a luminaire 100, in accordance with an embodiment of the present disclosure. For ease of description, the system of FIG. 5A will be used to describe the methodology. The method includes determining 541 whether a luminaire 100 needs to be commissioned. In some embodiments, a commissioning flag may be used to indicate whether or not a luminaire 100 has been commissioned. The commissioning flag may be, for example, stored in memory 130 (e.g., non-volatile memory) and may be a binary determination (e.g., low/0=noncommissioned and high/1=commissioned, or vice versa). If at 541, commissioning is not needed and the luminaire 100 already knows its location information, then the method continues by having the luminaire 100 emit 543 its position (e.g., via LCom signals). Further, the method continues from 543 back to 541 to continue to determine whether the luminaire 100 needs to be commissioned.

An example case of when a luminaire 100 may have to be commissioned after having already been commissioned (in other words, when the luminaire 100 has to be re-commissioned), is when the luminaire 100 is moved from its initial position (the position at which it was originally commissioned). In such a case, the luminaire 100 may include an intrusion detection system that detects when the luminaire 100 is moved such that it would have to be re-commissioned to provide accurate location information via, for example, LCom signals. The intrusion detection system may include, for example, an intrusion detection module and an intrusion detection memory bit. The intrusion detection module may include an accelerometer 169 and/or a gyroscopic sensor 167 that can be used to determine when the luminaire 100 has been moved. Further, the intrusion detection bit within the luminaire memory 130 can operate in a similar way that the commissioning flag operates (e.g., 0/low=intrusion detected and re-commissioning needed and high/1=intrusion not detected, or vice versa). For example, when the intrusion detection memory bit is in a high/1 state (to indicate intrusion is not detected) and the accelerometer 169 and/or gyroscopic sensor 167 exceed a predetermined threshold, then the intrusion detection memory bit may be switched to a low/0 state (to indicate intrusion has been detected). As will be apparent in light of this disclosure, in such a case where one or more luminaires 100 are moved within a space including one or more luminaires 100 that have not been moved (and thereby are properly commissioned), then the luminaires 100 that have not been moved can be used to help the moved luminaires 100 during the re-commissioning process. Similarly, properly commissioned luminaires 100 can be used to help commission newly installed luminaires 100 that have not yet been commissioned.

Continuing with the method of FIG. 5C, if it is determined 541 that the luminaire needs to be commissioned (e.g., commissioning flag=low/0), then the method continues by determining 545 if a commissioning/computing device 200 signal is available. Such a determination 545 may be made by trying to establish a communication connection with the device 200, by searching for compatible devices 200 (e.g., to establish a Bluetooth or Wi-Fi connection), or by waiting to receive signals from the device 200 (e.g., via IR), for example. If at 545 no commissioning device 200 signals are available, then the method continues to review until a commissioning device 200 signal is available.

In some embodiments, where the method is reviewing for a commissioning device 200 signal, the method may include optionally providing feedback 546 to indicate that commissioning is needed. Feedback may include visual, aural, and/or tactile feedback from the luminaire 100 indicating that the luminaire needs to be commissioned. For example, visual feedback may include continually blinking the light output (e.g., between a minimum and maximum dimming value), continually changing the light output color, continually changing the light output spread or focus, changing the light output color to a particular color (e.g., an atypical color), not turning on all of the light sources of the luminaire 100, or some other suitable visual cue, until the luminaire 100 has been commissioned. Aural feedback may include, for example, playback of a continual sound or music, an intermittent sound (e.g., chirping), or some other suitable aural cue, until the luminaire 100 has been commissioned. Tactile feedback may include, for example, a constant vibration of the luminaire, an intermittent vibrating, or some other suitable tactile cue, until the luminaire 100 has been commissioned.

Continuing from 545, if a commissioning device 200 signal is available, the method can continue by updating 547 location information. Such an update 547 may be performed by programming the location information into the memory 130 of the luminaire 100, for example. After the update 547 has been performed, the method may optionally include setting 548 the commissioning flag to indicate that commissioning is not needed (e.g., commissioning flag=high/1) and the method can continue by emitting 543 the luminaire position. Setting 548 the commissioning flag to indicate that commissioning is optional, because in some cases, such as where the luminaire 100 is auto-commissioning, the process may be an iterative one that takes time to obtain an accurate enough position. In such a case, the commissioning flag may only be set 548 to indicate the commissioning is not needed after a predetermined amount of commissioning/computing devices 200 have transmitted location information, after a predetermined amount of time, or after some other suitable event. In addition, in some cases, the commissioning flag may only be set 548 after a successful commission has been performed, thereby making the process more reliable.

Numerous variations on the methodology of FIGS. 5B and 5C will be apparent in light of this disclosure. As will be appreciated, and in accordance with some embodiments, each of the functional boxes shown in these figures can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field-programmable gate array, purpose-built silicon, etc.). In some embodiments, a non-transitory computer program product encoded with instructions that, when executed by one or more processors, causes a process to be carried out, the process comprising the method of FIGS. 5B and/or 5C.

In an example case, such as when a new luminaire 100 is installed, the commissioning flag may stay low (or at 0) to indicate that the luminaire 100 has not been commissioned and feedback may be provided (e.g., the luminaire 100 blinks when connected to a power source). The luminaire 100 can then be commissioned using the techniques variously described herein. For example, a commissioning/computing device 200 may be used to commission the luminaire 100. When the device 200 is brought under a noncommissioned luminaire 100 (or near a noncommissioned luminaire, where the luminaire 100 is not overhead), the device 200 and the luminaire may perform a handshake to establish a communication connection. After establishing connection, location information may be transmitted from the device 200 to the luminaire 100. In some such instances, additional information may be transmitted, such as network ID. As soon as the luminaire is programmed with the location information, the commissioning flag goes high (or to 1) and the luminaire 100 feedback can stop (e.g., the luminaire light stops blinking). The user commissioning the luminaires 100 may then continue on to the next luminaire 100 that is blinking until all luminaires 100 have been commissioned, at which point no luminaires would be left blinking and the user would know that all luminaires have been commissioned. If a luminaire 100 is subsequently moved, it may blink after it is relocated and connected to a power source (e.g., as a result of the intrusion detection bit being set), thereby indicating that the luminaire 100 has to be re-commissioned.

In some embodiments, commissioning may be performed real-time. For example, in the case of a luminaire 100 inside of an elevator or other moving environment, commissioning/computing device 200 may continually transmit dynamic location information to luminaire 100 to program (e.g., temporarily program) the luminaire 100 with proper position location information. In this manner, the device 200 can help program the luminaire 100 with proper location information, such that subsequent devices 200 that receive location information from luminaire 100 (e.g., via LCom signals) will be provided more accurate position information. Without access to a commissioning/computing device 200 that can help luminaire 100 determine its position, luminaire 100 would have to have local componentry (e.g., accelerometers, Wi-Fi module, etc.) to determine location information independent from commissioning/computing devices 200. In some such cases, luminaire 100 may be communicatively coupled to the moving environment, such as being communicatively coupled to an elevator the luminaire 100 is installed in to determine elevator floor information or being communicatively coupled to a ship the luminaire 100 is installed in to determine changes in global/absolute location.

An example alternative to the commissioning techniques described herein may be to include componentry within a luminaire 100 to enable the luminaire to determine its own position without using a computing/commissioning device 200. For example, such a luminaire may be equipped with local or personal area network capabilities (e.g., using Wi-Fi or ZigBee chipsets) such that positioning can be performed just using the luminaire (e.g., using suitable WPS techniques or other suitable positioning techniques). However, this alternative requires that each luminaire include the additional hardware needed to accomplish such self-positioning capabilities as opposed to using a smartphone, tablet, and/or other computing/commissioning device to assist with the commissioning process.

Therefore, the commissioning techniques variously described herein include multiple benefits, such as increasing reliability of the overall lighting system 10, increasing commissioning efficiency and cost-effectiveness, and increasing the likelihood that all luminaires 100 are commissioned. Further, the commissioning techniques include a system to aid in commissioning LCom-enabled luminaires during initial installation. For example, the system can help a user easily keep track of commissioned versus noncommissioned luminaires 100 by providing feedback (e.g., visual, aural, and/or tactile) from, for example, noncommissioned luminaires 100. Another benefit includes having systems to aid in re-commissioning an LCom-enabled luminaire after it has been relocated. For example, if the luminaire is to be re-commissioned manually (e.g., using a computing/commissioning device 200), feedback may be provided to indicate that the luminaire needs to be re-commissioned, such as blinking visible light until the luminaire 100 is properly re-commissioned. As a result, the commissioning techniques can help increase reliability of the overall lighting system 10, increase commissioning efficiency, and increase the likelihood that all luminaires 100 are commissioned. Additional benefits of the techniques will be apparent in light of the present disclosure.

Light-Based Communication (LCom) Visual Hotspots

As previously noted, there are a number of non-trivial challenges to establishing and maintaining successful LCom between an LCom-enabled luminaire and a given receiver device, as well as to using LCom to determine location and positioning of the receiver device (and thus the user, if present) for purposes of providing navigation, indoor or otherwise, or for other suitable applications. For example, one such challenge is providing notice that LCom is available in a particular location. Such a challenge may be present due to LCom being designed, in some embodiments, to be difficult or impossible to detect by the human eye to prevent the issues that would come with visibly pulsing/modulating light output. Further, such a challenge may be present due to an LCom-enabled luminaire being overhead, such that it is not in potential users' typical visual line of sight. As a result, even if a visual cue were provided near or on an LCom-enabled luminaire, users may not look at the luminaire in their normal course of using the space containing the luminaire. Further still, such a challenge may be present due to LCom technology being new and unknown to potential users. Therefore, educating potential users that LCom is available and also teaching users how to effectively use LCom is a challenge.

Thus and in accordance with some embodiments, techniques are disclosed for projecting visible cues to assist with the LCom system, the visible cues referred to herein as visual hotspots. The visual hotspots can be projected using a luminaire that may or may not be LCom-enabled. Typically, the visual hotspots will be projected onto the floor or ground of an area including an LCom system, or on another suitable surface. The visual hotspots can be used for numerous benefits, including alerting a potential user that LCom is available, educating the user about LCom technology, and assisting the user in using the LCom signals available in the area, just to name a few example benefits. The visual hotspots may include images, symbols, cues, characters (e.g., letters, words, numbers, etc.), indicators, logos, or any other suitable content. In some cases, the visual hotspots may be interactive, such that a user can scan the hotspot (e.g., using a computing device, such as a smartphone camera) to cause an action to occur (e.g., launch an application or website). In some embodiments, the hotspots may alternatively or additionally include audio cues.

Figure 6:
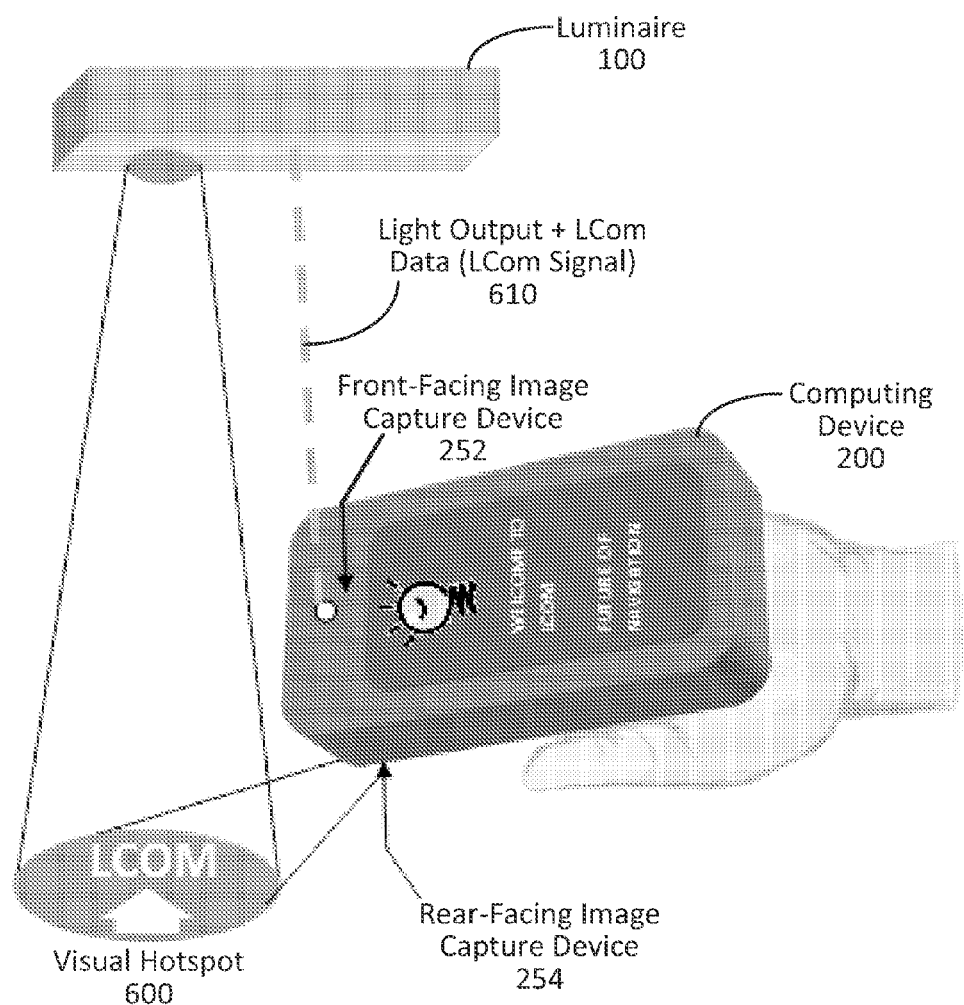
FIG. 6 illustrates an example LCom system including a projected visual hotspot, in accordance with an embodiment of the present disclosure.

FIG. 6 illustrates an example LCom system including a projected visual hotspot 600, in accordance with an embodiment of the present disclosure. As can be seen, luminaire 100 is providing light output 610 that includes an LCom signal, in this example case. Luminaire 100 may be configured in any suitable manner, including using the configurations and system architecture variously described herein. Further, light output 510 and the accompanying LCom signal(s) may be emitted/transmitted from luminaire 100 in any suitable manner, including using the techniques variously described herein. Luminaire 100 is also projecting visual hotspot 600 on the floor/ground. In this example case, visual hotspot 600 includes the word "LCOM", which can provide notice to potential users that LCom is available in the area or with that particular luminaire 100. Further, visual hotspot 600 includes an arrow that can be used, for example, to help with the orientation of computing device 200, as will be described in more detail herein. Although in this example case luminaire 100 is providing both an LCom signal (via light output 610) and the visual hotspot 600 projection, in other cases, the luminaire 100 may provide only one of the light output 610 including an LCom signal and the visual hotspot. In other words, in some cases, the device projecting the visual hotspot (e.g., a projector) may be separate from the LCom-enabled luminaire 100. Further, although the light output 610 including an LCom signal is shown coming from a different light source of luminaire 100 than the light source projecting visual hotspot 600, in some cases, the light output 610 and visual hotspot 600 may be provided by the same light source(s) of the luminaire 100. For example, in a lighting system including multiple luminaires, the visual hotspot projecting device may be placed, for example, in one row, group, or area of the lighting system to provide the benefits described herein, such as alerting potential users that LCom is available.

As previously described, the visual hotspot 600 may include images, symbols, cues, characters (e.g., letters, words, numbers, etc.), indicators, logos, or any other suitable content. In some cases, the visual hotspot 600 may be static, while in other cases, the visual hotspot. For example, static visual hotspots may include the same projection over a period of time, whereas dynamic visual hotspots may change over time. Dynamic visual hotspots may change based on light output, such as having the projection blink on and off or dim from one brightness to another, change in color, or change in some other suitable manner that does not alter the content of the visual hotspot. Dynamic visual hotspots may also change based on the content of the projection, such as based on a cycle of information, based on real-time information causing the visual hotspot to change, or based on some other stimulus, action, or event that would cause the visual hotspot to change its content. An example case of a dynamic visual hotspot may include changing the content (and/or light output) of the projection based on an emergency situation (e.g., to help route users out of a building, to help route emergency personnel, etc.). Another example case of a dynamic visual hotspot may include changing the content (and/or light output) of the projection based on the users in the area (e.g., project a personal message for a user within the area of the visual hotspot).

Other example cases of dynamic visual hotspots would be changing the content (and/or light output) of the projection based on the time of day, the brightness of the environment, a new arrival or sale/discount, etc.

In some cases, the visual hotspot 600 may be a Universal Product Code (UPC) or Quick Response (QR) code (also called a QR tag), which is a two-dimensional bar codes that has the ability to capture a large stream of data equating to several thousand characters (as compared to, e.g., 12 characters of information from a typical UPC). In such as case, computing device 200 can be used to scan, read, and/or decode the visual hotspot in a manner similar to the way that QR codes are scanned, read, and/or decoded. Any known or suitable technology, program, or application can be used to detect/read/interpret/decode such UPC and QR codes. Accordingly, visual hotspots may be used to perform various actions (e.g., upon reading/decoding the visual hotspot), including executing an application, navigating to a uniform resource locator (URL), providing information related to LCom, provide marketing information, unlock exclusive content, providing a notification, and/or any other suitable action as will be apparent in light of this disclosure. In some cases, LCom signals may be detected and/or decoded while simultaneously scanning, reading, and/or decoding a visible cue. In some such cases, the LCom signals may be detectable from the visible cue.

In some cases, the visual hotspot 600 may provide orientation data to assist with LCom applications, such as receiving LCom signals, using LCom for navigation purposes, or other suitable applications as will be apparent in light of the present disclosure. For instance, if the visual hotspot 600 has non-symmetric features, such as an arrow, and the arrow is always facing a particular direction, such as north, then the computing device 200 can use the hotspot to orient itself to the luminaire 100 by, for example, recognizing the direction of the arrow in the image of the hotspot. FIG. 6 provides such an example, where the visual hotspot 600 includes an arrow to help with orientation of the computing device 200. In some cases, where the visual hotspot 600 is directly below the luminaire 100 providing an LCom signal, such as is the case in FIG. 6, the hotspot 600 may help position the user under the luminaire 100 to increase LCom signal detection integrity and/or help with LCom applications. In some such cases, the user may benefit by standing directly on the visual hotspot 600, and notification of the same may be provided (e.g., by the hotspot).

The LCom system 10 of FIG. 6 also includes computing device 200 which may be configured as variously described herein. For example, as shown, computing 200 device is a smartphone that includes front-facing image capture device 252 (e.g., a front-facing camera) and rear-facing image capture device 254 (e.g., a rear-facing camera). In some cases, the visual hotspot 600 may be passive, such that the hotspot only provides assistance to a user by visually looking at the content actually projected. For example, the visual hotspot 600 may notify the user that LCom is available in the area, thereby enticing a potential user to figure out what LCom is or notify users aware of LCom to launch an LCom application. In other cases, the visual hotspot 600 may be active, such that scanning the visual hotspot using one of the device 200 cameras, such as the rear-facing camera 254, may cause an action to execute. Accordingly, in some cases, the visual hotspot 600 may be machine-readable. Actions may include, for example, initiating an application/program on the device 200 (e.g., a store application or an LCom application), navigating to a website or uniform resource locater (URL) using the device 200 browser (e.g., a store website/URL, or a website/URL that allows the user to download an LCom application or learn more about LCom), causing a message to display on the device 200, initiate LCom-based navigation using the device 200, or some other suitable action depending upon the target application or end use. In some such cases, the user may have to preliminary initiate a program, such as a camera application, a visual hotspot scanning application, or some other suitable application. In other cases, the image capture device may be constantly on and thus placing the visual hotspot within the field of view of the image capture device may be the only action the user has to take. Whether or not the visual hotspot 600 is active or passive may be based on the hotspot content and/or the device 200 (or application 216) being used to scan or otherwise read the hotspot.

In some embodiments, the LCom signal(s) provided by luminaire 100 may be provided via light output 610 and/or visual hotspot 600. In some cases, it may be beneficial to project LCom signals with the visual hotspot 600. For example, most floors in commercial settings (where LCom may be utilized) are hard, flat surfaces which may be beneficial for the detection of LCom signals. Further, because visual hotspots 600 can be projected on the floor/ground of an area, scanning the hotspot 600 can be performed using the rear-facing camera 254 as a result of the natural/intuitive manner that a user uses computing device 200 (such as a smartphone). This is beneficial, because rear-facing cameras 254 of existing smartphones typically are easier to aim than front-facing cameras 252 and visual hotspots 600 provide a specific target to aim at, and rear-facing cameras 254 typically have higher resolutions and faster frame rates. In some embodiments, the combination of LCom signals from luminaire 100 and information provided by scanning visual hotspot 600 may be used for certain applications. For example, visual hotspot 600 may notify a user that LCom is in the area. Scanning the visual hotspot 600 (e.g., using rear-facing camera 254) may result in the initiation of a navigation application on computing device 200 and after the application launches (or in a simultaneous fashion), LCom signals provided by luminaire 100 via light output 610 and/or visual hotspot 600 may be detected (e.g., using front-facing camera 252 and/or rear-facing camera 254) to, for example, determine the computing device 200 position to be used as a starting point for the navigation. At this point, the destination may be automatically programmed based on the visual hotspot 600 that was scanned or the LCom signals detected, or the destination may be entered by the user. Numerous variations and applications will be apparent in light of the present disclosure.

A specific example case includes a shopper coming into a store looking for a product. Throughout the store, there are visual hotspots on the floor, such as the hotspot 600 shown in FIG. 6. The hotspot may then entice the shopper to lookup information about LCom or ask a sales person about LCom. If the store has a smartphone application that the shopper is already using, then that application may natively support LCom technology or provide additional information about LCom. Furthermore, the shopper might resort to looking at the maps application on their phone which indicates that GPS is not available indoors and to look for LCom hotspots. Once the shopper understands that LCom can be used for navigation or other suitable purposes, they might be inclined to aim their smartphone at the hotspot using, for example, the smartphone camera application (in a manner similar to how a user can scan a QR tag) or try to detect LCom signals in the area. After scanning the hotspot or detecting an LCom signal, an action may be performed, as variously described herein. For example, if the shopper is buying deli meats in a grocery store, while waiting for his/her number to be called, the shopper may see a visual hotspot 600 that prompts the user to scan the hotspot and/or scan the area for LCom signals using the device 200, which may cause weekly deli meat discounts to be provided or which may give the user the choice to build different sandwiches, thereby navigating the user to the appropriate sections of the store after selecting a sandwich to pick up the remaining ingredients (e.g., condiments section, cheese section, bread section, vegetable section, etc.).

In another example, the visual hotspot 600 may be used in a vehicle navigation context to indicate that LCom is available in the area. In such an example, the visual hotspot may notify the driver/pilot/captain/etc. that LCom is available and the user may switch to navigation based on LCom signals. Also, in such an example, a vehicle may be equipped to scan or otherwise read a visual hotspot projected on or near the road to indicate that LCom navigation is available and/or to indicate to the vehicle that LCom signals should be used as the primary signal source for determining vehicle location. To provide a specific example, in the case of LCom-based automotive navigation, if a car is coming upon a tunnel or parking garage (where GPS signals may be weak or unavailable), a visual hotspot may indicate to the driver that LCom is available in the tunnel/parking garage (and thus the driver may initiate LCom-based navigation) and/or the car may scan the visual hotspot to initiate LCom-based navigation automatically. In such a specific example, the transition from navigation based on GPS signals to LCom signals may be seamless such that the driver does not even know that the transition occurred. In some instances, the LCom signals may supplement other signals used for navigation (e.g., supplement GPS signals), while in other instances, LCom signals may supplant other signals used for navigation, and such instances may alternate based on the signals available. Numerous other use cases will be apparent in light of the present disclosure.

An example alternative to the visual hotspot techniques described herein for notifying potential users that LCom is available in a particular area may be to post signs or stickers to notify potential users that LCom is available in the area. Another example alternative may be to educate the public through marketing to check for LCom signals. However, such alternatives may be inefficient, ineffective, and/or costly, and may require a burdensome commitment from the owner of the area. Further, such an alternative does not provide the other benefits of using visual hotspots variously described herein. For example, the visual hotspot techniques can provide the benefits of alerting potential users that LCom is available in a particular area or for particular luminaires, educating the potential users about the LCom technology, and assisting the user with properly orienting the LCom receiver 200. In addition, a visual hotspot may include active/interactive capabilities that results in one or more action being performed when the hotspot is scanned or otherwise read. As a result, LCom may be used to enhance the consumer shopping experience. Additional benefits of the techniques variously described herein and of using visual hotspots will be apparent in light of the present disclosure.

Numerous embodiments will be apparent in light of this disclosure. One example embodiment provides a luminaire including: at least one solid-state light source configured to output light; and at least one modulator configured to modulate the light output to allow for emission of light-based communication (LCom) signals; wherein the luminaire is configured to project a visible cue that indicates LCom capability of the luminaire. In some cases, the total light output of the luminaire is configured to be maintained at a relatively constant level, such that the light output variance is not perceptible by human vision. In some cases, the visible cue indicates that LCom is available in an area illuminated by the luminaire. In some cases, the visible cue can be used to assist with orienting a device configured to receive the LCom signals. In some cases, the visible cue is machine-readable, such that scanning the visible cue causes an action to be performed. In some such cases, the action is at least one of: execute an application; and navigate to a uniform resource locator (URL). In some such cases, the action causes information about LCom to be presented. In some cases, the visible cue changes over time. In some cases, the visible cue is a Quick Response (QR) code. In some cases, the LCom signals can be detected by scanning the visible cue. In some cases, a system is provided, the system including the luminaire and a computing device configured to detect and decode the LCom signals.

Another example embodiment provides a system including: a luminaire that includes: at least one solid-state light source configured to output light, and at least one modulator configured to modulate the light output to allow for emission of light-based communication (LCom) signals; and a computing device configured to detect the LCom signals, the computing device including a first image capture device having a first field of view (FOV), and a second image capture device having a second FOV approximately opposite the first FOV; wherein the system is configured to project a visible cue that indicates LCom capability of the luminaire. In some cases, the visible cue is projected by the luminaire. In some cases, the computing device can be oriented such that the LCom signals are within the first FOV and the visible cue is within the second FOV. In some cases, the visible cue is readable by the computing device and an action can be performed based on scanning the visible cue while simultaneously decoding the LCom signals. In some such cases, the first image capture device scans the visible cue and the second image capture device decodes the LCom signals.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes: utilizing a computing device including an image capture device having a field of view (FOV), scan for a visible cue within the FOV, the visible cue readable by the computing device; and in response to reading a visible cue, initiate an action; wherein the computing device is configured to detect and decode light-based communication (LCom) signals and the visible cue indicates LCom capability is available in a given area. In some cases, the LCom signals are provided via light output modulated such that the light output variance is not perceptible by human vision. In some cases, the action includes at least one of executing an application, navigating to a uniform resource locator (URL), providing information related to LCom, provide marketing information, unlock exclusive content, and providing a notification. In some cases, the LCom signals can be detected and decoded while reading the visible cue.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as various disclosed or otherwise demonstrated herein.

What is claimed is:

1. A luminaire comprising:
at least one solid-state light source configured to output light; and
at least one modulator configured to modulate the light output to allow for emission of light-based communication (LCom) signals, the LCom signals detectable within a first field of view (FOV) of a first image capture device of a computing device;
wherein the luminaire is configured to project a visible cue that indicates LCom capability of the luminaire, the visible cue detectable within a second FOV of a second image capture device of the computing device, the second FOV approximately opposite the first FOV.

2. The luminaire of claim 1, wherein the total light output of the luminaire is configured to be maintained at a relatively constant level, such that the light output variance is not perceptible by human vision.

3. The luminaire of claim 1, wherein the visible cue indicates that LCom is available in an area illuminated by the luminaire.

4. The luminaire of claim 1, wherein the visible cue can be used to assist with orienting a device configured to receive the LCom signals.

5. The luminaire of claim 1, wherein the visible cue is machine-readable, such that scanning the visible cue causes an action to be performed.

6. The luminaire of claim 5, wherein the action is at least one of execute an application, and navigate to a uniform resource locator (URL).

7. The luminaire of claim 6, wherein the action causes information about LCom to be presented.

8. The luminaire of claim 1, wherein the visible cue changes over time.

9. The luminaire of claim 1, wherein the visible cue is a Quick Response (QR) code.

10. The luminaire of claim 1, wherein the LCom signals can be detected by scanning the visible cue.

11. A system comprising the luminaire of claim 1 and the computing device.

12. A system comprising:
a luminaire comprising:
at least one solid-state light source configured to output light; and
at least one modulator configured to modulate the light output to allow for emission of light-based communication (LCom) signals; and
a computing device configured to detect the LCom signals, the computing device comprising:
a first image capture device having a first field of view (FOV); and
a second image capture device having a second FOV approximately opposite the first FOV;
wherein the system is configured to project a visible cue that indicates LCom capability of the luminaire and the computing device can be oriented such that the LCom signals are within the first FOV and the visible cue is within the second FOV.

13. The system of claim 12, wherein the visible cue is projected by the luminaire.

14. The system of claim 12, wherein the visible cue is readable by the computing device and an action can be performed based on scanning the visible cue while simultaneously decoding the LCom signals.

15. The system of claim 14, wherein the first image capture device scans the visible cue and the second image capture device decodes the LCom signals.

16. A non-transitory computer program product encoded with instructions that, when executed by one or more processors, causes a process to be carried out, the process comprising:
utilizing a computing device including a first image capture device having a first field of view (FOV), scan for a visible cue within the first FOV, the visible cue readable by the computing device; and
in response to reading a visible cue, initiate an action;
wherein the computing device further comprises a second image capture device having a second FOV approximately opposite the first FOV, the second image capture device configured to detect and decode light-based communication (LCom) signals within the second FOV and the visible cue indicates LCom capability is available in a given area.

17. The computer program product of claim 16, wherein the LCom signals are provided via light output modulated such that the light output variance is not perceptible by human vision.

18. The computer program product of claim 16, wherein the action includes at least one of executing an application, navigating to a uniform resource locator (URL), providing information related to LCom, provide marketing information, unlock exclusive content, and providing a notification.

19. The computer program product of claim 16, wherein the LCom signals can be detected and decoded while reading the visible cue.

* * * * *